United States Patent [19]

Kercher

[11] Patent Number: 5,356,265

[45] Date of Patent: Oct. 18, 1994

[54] CHORDALLY BIFURCATED TURBINE BLADE

[75] Inventor: David M. Kercher, Ipswich, Mass.

[73] Assignee: General Electric Company, Cincinnati, Ohio

[21] Appl. No.: 935,061

[22] Filed: Aug. 25, 1992

[51] Int. Cl.⁵ .............................................. F01D 5/18
[52] U.S. Cl. .................................................. 416/97 R
[58] Field of Search ................... 416/95, 96 R, 97 R; 415/115, 116

[56] References Cited

U.S. PATENT DOCUMENTS

| | | |
|---|---|---|
| 3,533,711 | 10/1970 | Kercher . |
| 3,542,486 | 11/1970 | Kercher et al. . |
| 3,801,218 | 4/1974 | Moore . |
| 4,063,851 | 12/1977 | Weldon ........................ 415/115 |
| 4,118,146 | 10/1978 | Dierberger . |
| 4,135,855 | 1/1979 | Peill . |
| 4,224,011 | 9/1980 | Dodd et al. .................... 416/97 R |
| 4,601,638 | 7/1986 | Hill et al. ...................... 416/97 R |
| 4,940,388 | 7/1990 | Lilleker et al. ................ 416/97 R |

FOREIGN PATENT DOCUMENTS

| | | |
|---|---|---|
| 0135606 | 7/1985 | Japan ............................ 416/96 A |
| 0198305 | 10/1985 | Japan ............................ 416/97 R |

OTHER PUBLICATIONS

Haerter, "Flow Distribution and Pressure Change Along Slotfed or Branched Ducts," 11–14 Feb. 1963, Ashrae Journal, pp. 47 & 50.

Genium Publishing, "Supply Manifold Used with a Matrix Having Unrestricted, Undeflected Discharge Flow," Aug. 1974, Branching Flow Manifolds Section 404.3, p. 5.

Japanese Patent 19959, dated Feb. 1980, abstract only.

*Primary Examiner*—Harold J. Tudor
*Attorney, Agent, or Firm*—Jerome C. Squillaro; David L. Narciso

[57] ABSTRACT

A gas turbine engine turbine blade includes an airfoil having pressure and suction sides joined together at leading and trailing edges and extending from a root to a tip. The airfoil also includes a longitudinally extending flow channel for receiving compressed air, with the flow channel including a chordally extending, imperforate septum dividing the flow channel into first and second laterally spaced apart flow chambers. The blade further includes a supply manifold for receiving the compressed air at a single pressure which is disposed in flow communication with both the first and second chambers for channeling thereto respective first and second portions of the compressed air. The septum is used to reduce or eliminate radial velocity distortion, or blowoff of film cooling air from the suction side.

10 Claims, 2 Drawing Sheets

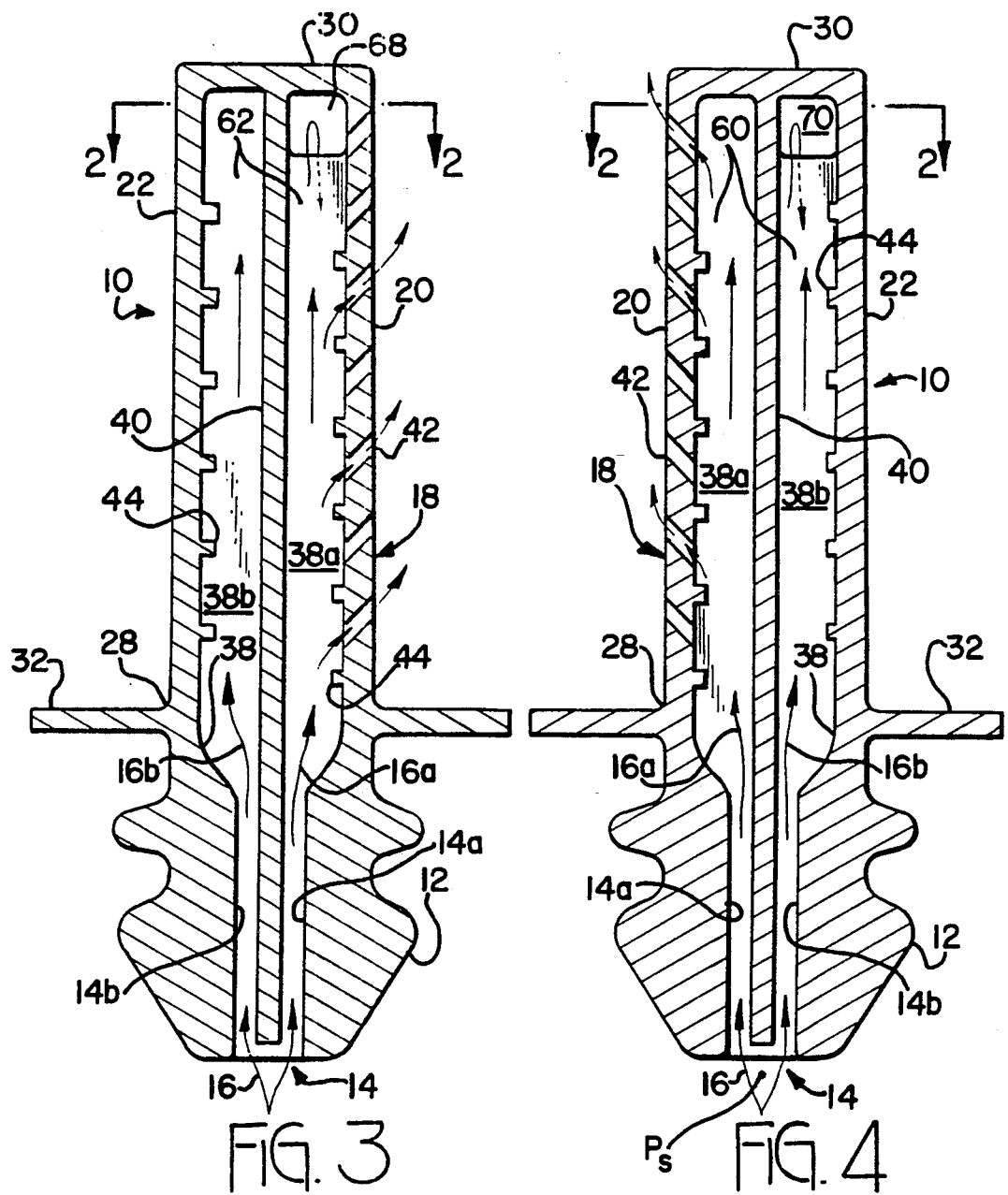

CHORDALLY BIFURCATED TURBINE BLADE

The present invention relates generally to gas turbine engine turbine blades, and, more specifically, to a turbine blade having improved cooling.

BACKGROUND OF THE INVENTION

A conventional gas turbine engine includes a compressor for providing compressed air to a combustor wherein it is mixed with fuel and ignited for generating combustion gases. The combustion gases are channeled firstly through a high pressure turbine and typically through a low pressure turbine disposed downstream therefrom for extracting energy to drive the compressor and provide output power in the form of a combustion gas exhaust jet or shaft power for rotating a fan for generating thrust for powering an aircraft in flight. The efficiency of the engine is directly related to the high pressure turbine inlet temperature of the combustion gases channeled thereto. Since the combustion gases are considerably hot, the turbine rotor blades are typically hollow and provided with conventional film cooling holes for providing effective cooling thereof for ensuring a useful operating life. A portion of the compressed air from the compressor is suitably channeled to the turbine blades for cooling, and since such compressed air does not undergo combustion in the combustor, the net efficiency of the engine is decreased.

Accordingly, turbine blades are continually being improved for reducing the required amount of compressor cooling air channeled thereto for improving overall efficiency of the engine while still providing acceptable life of the blade. For example, in advanced gas turbine engines being presently considered, substantial reductions in cooling airflow through the turbine blades is being considered along with a substantial increase in the turbine rotor inlet temperature for substantially improving the operating efficiency of the engine. This will require a substantial increase in heat transfer effectiveness in cooling the turbine blades using the reduced amount of cooling airflow.

A conventional turbine blade includes a concave pressure side and a convex suction side over which the static pressure of the combustion gases channeled thereover varies significantly. Compressed air is conventionally channeled upwardly through the blade dovetail and into conventional serpentine passages through the blade airfoil for the convective cooling thereof. The several passages within the blade airfoil may have various heat transfer enhancement turbulator ribs or pins for increasing the heat transfer coefficient over that for a smooth wall. Furthermore, conventional film cooling holes are selectively provided around the surface of the airfoil as required for forming suitable film cooling air layers to protect the airfoil against the hot combustion gases. Since the leading edge of the airfoil is typically subjected to the highest heat flux from the combustion gases, it typically requires the greatest protection from the heat and the highest heat transfer enhancement from the compressed air being channeled through the airfoil.

In one conventional airfoil having a mid-chord radial flow channel, the compressed air is normally channeled therethrough with a fairly uniform parabolic radial velocity distribution with a maximum velocity near the center of the channel and lower velocities adjacent the pressure and suction side interior walls of the airfoil. However, it has been observed that by providing a plurality of film cooling holes along the radial channel to eject uniformly part of the inlet channel air flow out the airfoil external surface on only one side of the channel, such as the pressure side, with the other, suction side of the channel being imperforate, the radial velocity distribution of the compressed air through the channel is distorted with the peak velocity being moved transversely toward the film cooling holes. Correspondingly, the velocity of the compressed air adjacent the opposite, suction side decreases for a given average flow rate through the channel. Accordingly, the decreased compressed air velocity adjacent the imperforate wall results in a decrease of the convective heat transfer enhancement of that wall which typically requires an increase in the average velocity of the compressed air to offset the decrease at the wall to ensure effective cooling thereof.

Furthermore, the turbine blade must also be designed to provide an adequate backflow margin to ensure that the combustion gases are not allowed to backflow through the film cooling holes into the blade airfoil during operation. The pressure of the compressed air inside the airfoil is, therefore, predeterminedly selected to be suitably larger than the pressure of the combustion gases flowing over the airfoil to ensure the forward flow of the compressed air from the interior of the airfoil through the film cooling holes to the exterior of the airfoil. Since the leading edge region of a typical high pressure turbine blade includes film cooling holes along both the pressure and suction sides of the airfoil, the pressure of the compressed air inside the airfoil must be suitably large to provide an effective backflow margin through the pressure side film cooling holes adjacent the leading edge which are subject to the highest pressure from the combustion gases flowable over the airfoil. However, since the pressure of the combustion gases channeled over the suction side of the airfoil is necessarily lower than that over the pressure side, the pressure ratio of the compressed air inside the airfoil relative to the suction side adjacent the leading edge is relatively high, and higher than the pressure ratio across the pressure side at the leading edge, which increases the ejection velocity of the film cooling air through the suction side leading edge film cooling holes. This may lead to a condition known as blowoff wherein the film cooling air initially breaks free from the airfoil suction side as it is ejected from the film cooling holes before reattaching to the suction side downstream therefrom. This leads to a decrease in the air film effectiveness and cooling capability of the film cooling air in this region.

In both of the above situations, the internal heat transfer coefficient and the film cooling effectiveness of the compressed air channeled through the airfoil are decreased, which requires even more air, for example, to ensure acceptable cooling of the turbine blade, which decreases overall efficiency. Furthermore, it is desirable to channel the compressed air through the airfoil with as little pressure losses therein as possible to further increase the overall efficiency of the engine.

Since a high pressure turbine blade typically includes several serpentine flow passages therein and film cooling holes along the pressure and suction sides thereof, as well as discharge holes through the trailing edge thereof, the blade must be suitably tested to ensure that suitable flow is obtained through all of the holes. In a turbine blade having two or more independent cooling air channels or circuits therethrough, for example one circuit channeling cooling air from the mid-chord and out through the leading edge holes, and a second circuit channeling air through the mid-chord and out the trailing edge holes, the several holes of each circuit must be independently plugged, for example, to test the operation of the other circuit. This is a relatively complex procedure required for ensuring effective operation of all the apertures through the blade airfoil.

SUMMARY OF THE INVENTION

A gas turbine engine turbine blade includes an airfoil having pressure and suction sides joined together at leading and trailing edges and extending from a root to a tip. The airfoil also includes a longitudinally extending flow channel for receiving compressed air, with the flow channel including a chordally extending, imperforate septum dividing the flow channel into first and second laterally spaced apart flow chambers. The blade further includes a supply manifold for receiving the compressed air at a single pressure which is disposed in flow communication with both the first and second chambers for channeling thereto respective first and second portions of the compressed air.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which:

FIG. 3 is a longitudinal sectional view of the blade illustrated in FIG. 1 taken along line 3—3.

FIG. 4 is a longitudinal sectional view of the blade illustrated in FIG. 1 taken along line 4—4.

DESCRIPTION OF THE PREFERRED EMBODIMENT(S)

Figure 1:
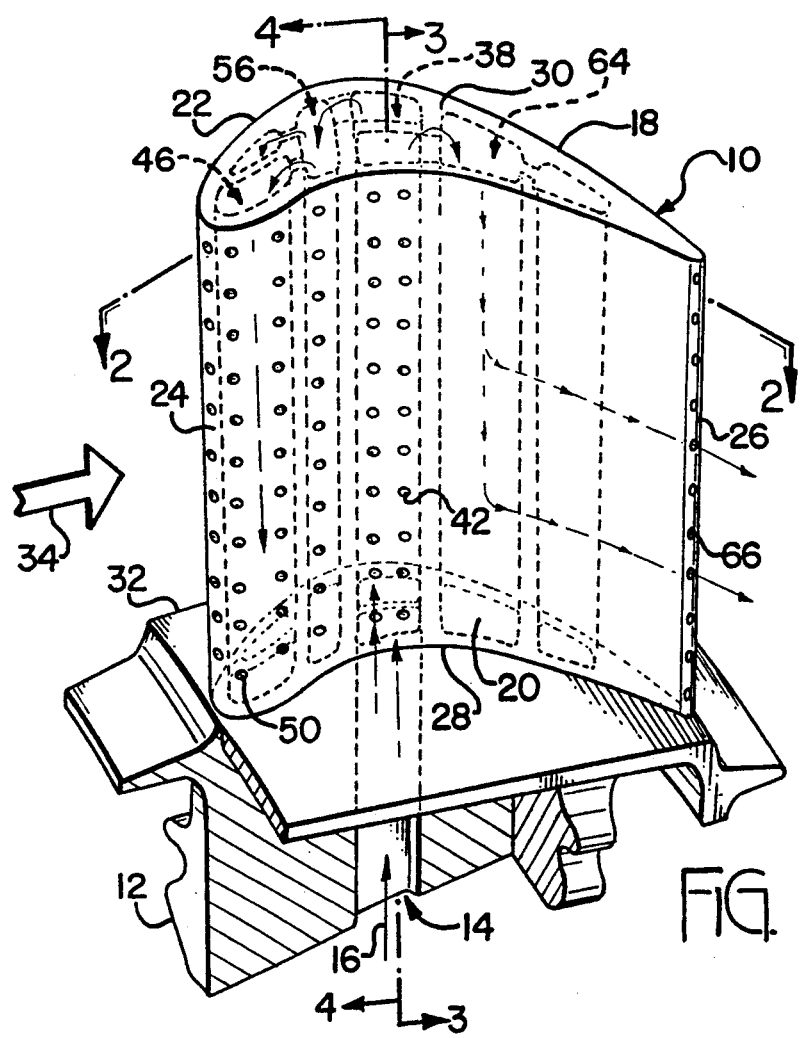
FIG. 1 is a perspective, schematic representation of an exemplary gas turbine engine turbine rotor blade having a bifurcated flow channel in accordance with one embodiment of the present invention.

Illustrated in FIG. 1 is an exemplary embodiment of a gas turbine engine, high pressure turbine rotor blade 10 having a conventional dovetail 12 for joining the blade 10 to a conventional rotor disk (not shown) having a complementary dovetail slot through which is axially inserted the dovetail 12. In this exemplary embodiment, the dovetail 12 includes an inlet supply channel or manifold 14 for receiving relatively cool, compressed air 16 from a conventional gas turbine engine compressor (not shown).

The blade 10 further includes an airfoil 18 having a first, outwardly concave, pressure side 20 and a second, outwardly convex, suction side 22 joined together at a leading edge 24 and a trailing edge 26 spaced axially therefrom, with the sides 20, 22 extending longitudinally or radially from a root 28 to a radially outer tip 30. The root 28 is integral with the top of the dovetail 12, with the blade 10 further including a conventional platform 32 at the root 28, which platform 32 provides a portion of the radially inner boundary for combustion gases 34 which are conventionally channeled over the airfoil 18 from the leading edge 24 to the trailing edge 26. As the combustion gases 34 are channeled over the airfoil 18 they effect a relatively high pressure on the airfoil pressure side 20 and a relatively low pressure on the airfoil suction side 22 which is used for rotating the disk containing the blades 10 in conventional fashion.

Figure 2:
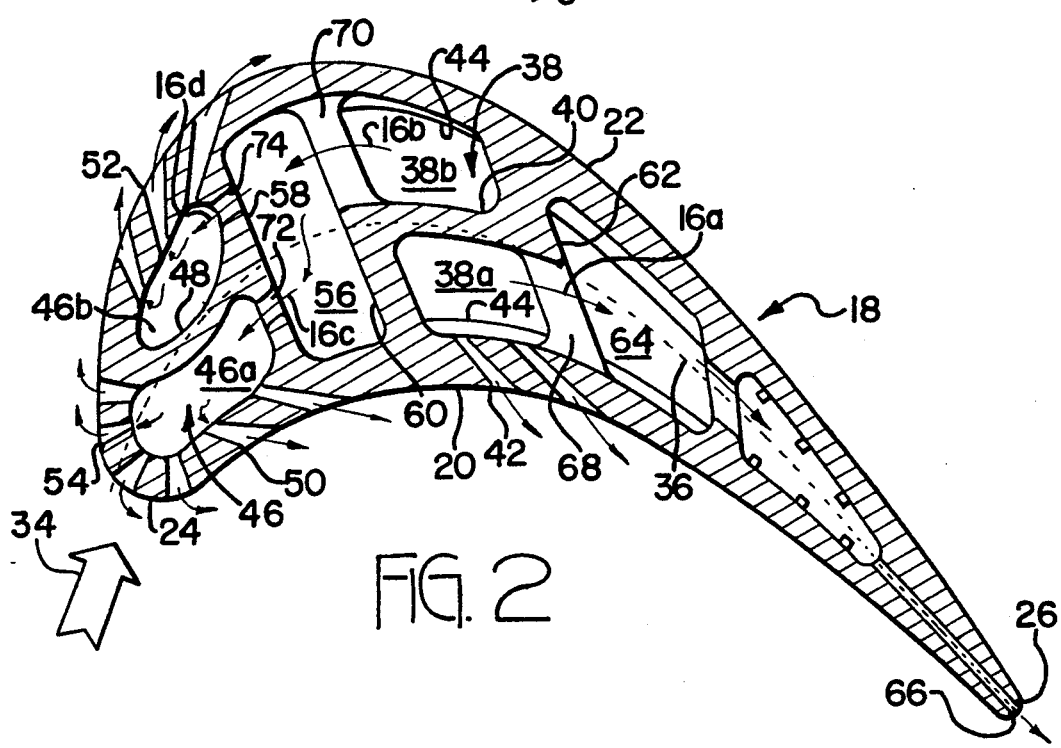
FIG. 2 is a transverse sectional view through the blade illustrated in FIG. 1 taken along line 2—2.

Referring also to FIG. 2, the airfoil 18 includes an arcuate camber or chordal line 36 extending generally equally between the pressure and suction sides 20 and 22 from the leading edge 24 to the trailing edge 26. In accordance with one embodiment of the present invention, the airfoil 18 includes a longitudinally extending mid-chord flow channel 38 extending upwardly from the inlet channel 14 and disposed in flow communication therewith for receiving the compressed air 16 therefrom. The mid-chord channel 38 is spaced along the chordal line 36 generally equally between the leading edge 24 and the trailing edge 26 in this exemplary embodiment and includes a chord-wise or chordally extending, imperforate first rib or septum 40 dividing the flow channel 38 into a first portion or chamber 38a disposed adjacent to the pressure side 20, and a second portion or flow chamber 38b spaced laterally from the first chamber 38a generally perpendicularly to the chordal line 36 and disposed adjacent to the suction side 22.

As shown in FIGS. 3 and 4, the first septum 40 extends radially inwardly from the tip 30 to the base of the dovetail 12 to bifurcate or divide both the mid-chord channel 38 into the two chambers 38a, 38b, and the inlet channel 14 into two chambers 14a and 14b being disposed in flow communication with the first and second chambers 38a, 38b, respectively for channeling thereto first and second portions 16a, 16b of the compressed air 16, respectively. In this embodiment of the invention, the inlet channel 14 is a supply manifold which receives the compressed air 16 at a single static pressure $P_s$ with this common pressure air then being channeled radially upwardly through the inlet chambers 14a, 14b into the two mid-chord chambers 38a, 38b.

Referring again to FIGS. 2–4, the airfoil pressure side 20 adjacent the first chamber 38a includes a plurality of longitudinally spaced apart, pressure side, mid-chord film cooling holes 42 disposed in two vertically extending rows, for example. The mid-chord film cooling holes 42 extend laterally through the pressure side 20 in flow communication with the first chamber 38a for receiving therefrom the compressed air first portion 16a for conventionally film cooling the airfoil pressure side 20 adjacent the first chamber 38a. The cooling holes 42 are preferably inclined upwardly toward the blade tip 30 and rearwardly toward the trailing edge 26 as they extend from the first chamber 38a to the pressure side 20.

The airfoil suction side 22 adjacent the second chamber 38b is imperforate in this embodiment of the invention and is characterized by the absence of any film cooling holes extending therethrough to the second chamber 38b for preventing flow of the compressed air second portion 16b from being discharged from the second chamber 38b directly through the airfoil suction side 22 at the second chamber 38b.

In a conventional turbine blade, the mid-chord flow channel 38 would not include the septum 40 and the compressed air 16 would simply be channeled radially upwardly therethrough for cooling the interior surfaces of both the pressure side 20 and the suction side 22 by convective heat transfer. The mid-chord channel 38 may include conventional turbulators 44 for example along the inner surfaces of the pressure and suction sides 20 and 22 for enhancing the convective heat transfer coefficient for improved cooling of the airfoil 18. However, as above described in the Background section, the mid-chord film cooling holes 42 cause the radial velocity distribution of the compressed air 16 to distort toward the pressure side 20 within the mid-chord channel 38, with the peak velocity being disposed nearer the pressure side 20 than the suction side 22, with a resulting reduction in velocity of the compressed air 16 adjacent the suction side 22 which decreases the convective heat transfer rate at that location. By providing the first septum 40 in accordance with the present invention, and separately channeling the compressed air first and second portions 16a, and 16b to the respective first and second chambers 38a and 38b, the radial velocity distortion through the mid-chord channel 38 may be reduced for improving the convective heat transfer coefficient adjacent the inner surface of the suction side 22 in the second chamber 38b. The distortion effect of the mid-chord film cooling holes 42 will then be localized only in the first chamber 38a, with the septum 40 blocking their adverse effect in radial velocity distribution in the second chamber 38b.

Accordingly, the radial velocity distribution through the second chamber 38b will be a substantially undistorted parabolic distribution with a wall velocity adjacent the suction side 22 being greater than it otherwise would be without the septum 40. In this way, an improved heat transfer coefficient is obtained along the inside surface of the suction side 22 in the second chamber 38b for improving the overall efficiency of cooling the airfoil 18. In this exemplary embodiment, the septum 40 is preferably disposed in the mid-chord channel 38 substantially equidistantly between the airfoil pressure and suction sides 20 and 22 for maximizing the flow area of the individual first and second chambers 38a and 38b for minimizing pressure losses therefrom.

Referring again to FIGS. 1 and 2, an alternate embodiment of the present invention includes a leading edge flow channel 46 extending longitudinally adjacent to the leading edge 24 between the leading edge 24 and the mid-chord channel 38. The leading edge channel 46 similarly includes a chordally extending, imperforate second rib or septum 48 dividing the leading edge channel 46 into a first portion or flow chamber 46a disposed adjacent to the pressure side 20, and an independent second portion or flow chamber 46b spaced laterally from the first chamber 46a generally perpendicularly to the chordal line 36 and disposed adjacent to the suction side 22. A plurality of leading edge, pressure side film cooling holes 50 are longitudinally spaced apart from each other and disposed in three exemplary vertical rows extending through the pressure side 20 in flow communication with the first chamber 46a.

The airfoil 18 further includes a plurality of longitudinally spaced apart, leading edge, suction side film cooling holes 52, also known as gill holes, with three exemplary vertical rows being illustrated, extending through the suction side 22 in flow communication with the second chamber 46b of the leading edge channel 46. A plurality of auxiliary, leading edge, suction side, film cooling holes 54 may be disposed between the leading edge 24 and the film cooling holes 52 in flow communication with the first chamber 46a for providing high pressure film cooling air immediately adjacent to the leading edge 24 for the effective film cooling thereof.

More specifically, the region of the airfoil 18 adjacent the leading edge 24 is subject to the highest heat flux from the combustion gases 34 and requires the most effective film cooling capability with a suitable amount of backflow margin. Since the leading edge first chamber 46a is disposed adjacent to the leading edge 24 and the pressure side 20, the film cooling holes 50 discharge to the highest pressure area of the combustion gases 34 channeled over the airfoil 18. They, therefore, require the highest pressure of cooling air in the first chamber 46a for maintaining an adequate backflow margin and for obtaining acceptable film cooling therefrom.

Accordingly, a mid-chord supply manifold 56 is disposed aft of the leading edge channel 46 and forward of the mid-chord channel 38 and extends longitudinally between the airfoil root 28 and tip 30. A first longitudinally extending rib 58 separates the leading edge channel 46 from the mid-chord supply manifold 56, a second longitudinally extending rib 60 separates the mid-chord supply manifold 56 from the mid-chord channel 38, and a third longitudinally extending rib 62 separates the mid-chord channel 38 from a longitudinally extending trailing edge flow channel 64. The trailing edge flow channel 64 may have any conventional design including the two channel embodiment illustrated.

The first rib 58, the second septum 48, and the leading edge portions of the airfoil 18 define the leading edge channel 46 and its two chambers 46a and 46b. The first and second ribs 58 and 60 along with respective portions of the airfoil 18 define the mid-chord supply manifold 56. The second and third ribs 60 and 62, the first septum 40, and the respective portions of the airfoil 18 define the mid-chord channel 38 including its two chambers 38a and 38b. The third rib 62 along with the trailing edge portions of the airfoil 18 define the trailing edge channel 64 which is disposed in flow communication with a plurality of longitudinally spaced apart trailing edge holes 66.

As illustrated in FIGS. 2 and 3, the mid-chord first chamber 38a preferably includes a single outlet 68 disposed adjacent to the airfoil tip 30 in flow communication with the trailing edge channel 64 for channeling the compressed air first portion 16a therethrough solely in an aft direction into the trailing edge channel 64 from the first chamber 38a. The compressed air first portion 16a then flows through the trailing edge channel 64 and is discharged from the airfoil 18 through the trailing edge holes 66 in one cooling air flow circuit from the mid-chord first chamber 38a.

The mid-chord second chamber 38b in this exemplary embodiment includes a single outlet 70 as shown in FIGS. 2 and 4, disposed adjacent to the airfoil tip 30 in flow communication with the mid-chord supply manifold 56 and in turn the leading edge channel 46 for channeling the compressed air second portion 16b therefrom solely in a forward direction into the mid-chord supply manifold 56 and in turn into both leading edge channel first and second chambers 46a and 46b.

The compressed air second portion 16b, therefore, fills the mid-chord supply manifold 56 with compressed air at a substantially single static pressure which is then, in turn, further divided for flow through the leading edge first and second chambers 46a and 46b. More specifically, a plurality of longitudinally spaced apart first inlet holes 72 extend through the first rib 58 and are disposed in flow communication between the mid-chord supply manifold 56 and the leading edge first chamber 46a for channeling thereto a portion of the compressed air second portion 16b designated compressed air third portion 16c.

A plurality of longitudinally spaced apart second Inlet holes 74 also extend through the first rib 58 and are disposed in flow communication between the mid-chord supply manifold 56 and the leading edge second chamber 46b for channeling another portion of the compressed air second portion 16b designated compressed air fourth portion 16d into the second chamber 46b. The first inlet holes 72 are predeterminedly sized to provide the compressed air third portion 16c into the leading edge first chamber 46a with reduced pressure but providing a minimum pressure ratio across the pressure side film holes 50 for maintaining a predetermined amount of backflow margin. The second inlet holes 74 are predeterminedly sized for metering or reducing pressure of the compressed air fourth portion 16d inside the leading edge second chamber 46b to decrease the pressure ratio across the suction side film holes 52 at the second chamber 46b to reduce or eliminate blowoff of the compressed air fourth portion 16d off the suction side 22. In this way, compressed air may be selectively provided at different pressures with a greater pressure in the leading edge first chamber 46a than in the leading edge second chamber 46b to correspond with the difference in pressure of the combustion gases 34 over the pressure side 20 and the suction side 22 for providing effective pressure ratios for obtaining acceptable backflow margin through the several film cooling holes 50, 52, and 54 as well as reducing or eliminating blowoff of the compressed air discharged from the leading edge, suction side film cooling holes 52.

Accordingly, the chordally extending first and second septums 40 and 48 may be provided in accordance with the present invention to bifurcate both the mid-chord channel 38 and the leading edge channel 46 for separately tailoring the performance thereof. In the mid-chord channel 38, the first septum 40 reduces the radial velocity distortion due to ejection of the compressed air through the mid-chord film cooling holes 42 on the pressure side 20 for enhancing the heat transfer coefficient along the inside surface of the airfoil suction side 22 in the second chamber 38b for example. The second septum 48 bifurcates the leading edge channel 46 to allow different pressures to be effected in the two chambers 46a and 46b to better match the pressures in the combustion gases 34 flowing separately over the airfoil pressure side 20 and suction side 22 for maintaining acceptable backflow margin while reducing or eliminating blowoff from the leading edge, suction side film cooling holes 52.

Accordingly, the blade 10 in accordance with the present invention provides an improvement in heat transfer for more effectively and more efficiently cooling the airfoil 18. The blade 10 may therefore be operated at higher turbine rotor inlet temperatures for a given flowrate of cooling air, or a reduction in the amount of compressed air 16 may be obtained for a given blade temperature for improving overall efficiency while obtaining acceptable cooling, or both.

Furthermore, the bifurcated mid-chord channel 38 forming the two separate flow circuits one extending rearwardly through the trailing edge channel 64 and the trailing edge holes 26 and the other extending forwardly through the leading edge channel 46 and the several film cooling holes 50, 52, and 54 allows for relatively easier air quantitative quality-control testing during the manufacturing process. By selectively plugging separately the mid-chord first chamber 38a or the mid-chord second chamber 38b at the respective inlet chambers 14a, 14b, the respective flow circuit may be obstructed so that the other flow circuit may be evaluated for providing a given amount of airflow therethrough. By being able to block either the mid-chord first chamber 38a or the second chamber 38b, blocking of all the individual film cooling holes or trailing edge holes of the different circuits is not required for measuring the airflow through the unobstructed circuit.

The airfoil 18 may include in any of its passages any additional heat transfer enhancement structures such as the turbulators 44 shown in the mid-chord channel 38 for improving the overall heat transfer ability and efficiency of the blade 18. All of the several film cooling holes 42, 50, 52, and 54 are preferably tapered or conical with an increased hole flow area from inlet to exit for controlling the rate of the compressed air channeled therethrough and for diffusing the compressed air to reduce its film hole exit velocity as it is ejected along the outer surfaces of the airfoil 18 for further improving the cooling air film effectiveness. And, although the invention has been described with respect to a turbine rotor blade, it may also be used with respect to turbine stator vanes.

Furthermore, although the airfoil 18 has been described with two separate cooling air circuits to the respective leading and trailing edges 24, 26 with the mid-chord channel 36 being an inlet to the airfoil 18 for receiving the compressed air 16 from the dovetail inlet channel 14, various alternate cooling air circuits may also be used and bifurcated with analogous septums 40, 48.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A gas engine turbine blade comprising:
   a dovetail for joining said blade to a rotor disk;
   an airfoil including:
      a pressure side and a suction side joined together at a leading edge and a trailing edge, and extending longitudinally from a root to a tip, said root being integrally joined with said dovetail;
      a chordal line extending between said pressure and suction sides from said leading edge to said trailing edge; and
      a longitudinally extending flow channel including a chordally extending, imperforate septum diving said flow channel into a first chamber disposed adjacent to said pressure side and a second flow chamber spaced laterally from said first chamber and disposed adjacent to said suction said; and
   a supply manifold for receiving compressed air at a single pressure, and disposed in flow communication with both said first and second chambers for channeling thereto first and second portions of said compressed air, respectively.

2. A turbine blade according to claim 1 wherein said airfoil pressure side adjacent said first chamber includes a plurality of longitudinally spaced apart film cooling holes extending therethrough in flow communication with said first chamber for receiving therefrom said compressed air first portion for film cooling said airfoil pressure side adjacent said first chamber.

3. A turbine blade according to claim 2 wherein said airfoil suction side adjacent said second chamber is imperforate for preventing flow of said compressed air second portion from being discharged from said second chamber directly through said airfoil suction side.

4. A turbine blade according to claim 3 wherein said septum is disposed in said flow channel substantially equidistantly between said airfoil pressure and suction sides.

5. A turbine blade according to claim 4 wherein said flow channel is a mid-chord channel spaced between said leading edge and said trailing edge, and said first chamber film cooling holes are pressure side, mid-chord film cooling holes; and said airfoil further includes:
- a leading edge channel extending longitudinally adjacent to said leading edge between said leading edge and said mid-chord channel, and disposed to flow communication with a plurality of leading edge film cooling holes extending through said airfoil adjacent said leading edge;
- a trailing edge channel extending longitudinally adjacent to said trailing edge between said trailing edge and said mid-chord channel in flow communication with a plurality of trailing edge holes; and
- said mid-chord channel first chamber includes an outlet disposed adjacent to said airfoil tip in flow communication with said trailing edge channel for channeling said compressed air first portion solely in an aft direction into said trailing edge channel; and
- said mid-chord second chamber includes an outlet disposed adjacent to said airfoil tip in flow communication with said leading edge channel for channeling said compressed air second portion therefrom solely in a forward direction into said leading edge channel.

6. A turbine blade according to claim 5 wherein said supply manifold is an inlet supply manifold disposed in said dovetail.

7. A turbine blade comprising:
a dovetail for joining said blade to a rotor disk;
a airfoil including:
- a pressure side and suction side joined together at a leading edge and a trailing edge, and extending longitudinally from a root to a tip, said root being integrally joined with said dovetail;
- a chordal line extending between said pressure and suction sides from said leading edge to said trailing edge; and
- a longitudinally extending flow channel including a chordally extending, imperforate septum dividing said flow channel into a first chamber disposed adjacent to said pressure side and a second flow chamber spaced laterally from said first chamber and disposed adjacent to said suction side; and
a supply manifold for receiving compressed air at a single pressure, and disposed in flow communication with both said first and second chambers for channeling thereto first and second portions of said compressed air, respectively; and wherein
said airfoil pressure side adjacent said first chamber includes a plurality of longitudinally spaced apart film cooling holes extending therethrough in flow communication with said first chamber for receiving therefrom said compressed air first portion for film cooling said airfoil pressure side adjacent said first chamber;

said flow channel is a leading edge channel extending longitudinally adjacent to said leading edge;

said film cooling holes extending through said first chamber are leading edge, pressure side film cooling holes; and said airfoil further includes leading edge, suction side film cooling holes extending through said suction side in flow communication with said second chamber.

8. A turbine blade according to claim 7 wherein:
said supply manifold is a mid-chord supply manifold disposed aft of said leading edge channel and extends between said airfoil root and tip;
said airfoil further includes a plurality of first inlet holes disposed in flow communication between said supply manifold and said first chamber for channeling said compressed air first portion thereto; and
said airfoil further includes a plurality of second inlet holes disposed in flow communication between said supply manifold and said second chamber for channeling said compressed air second portion thereto, said second inlet holes being sized for reducing pressure of said compressed air second portion inside said second chamber.

9. A turbine blade comprising:
a dovetail for joining said blade to a rotor disk;
an airfoil including:
- a pressure side and a suction side joined together at a leading edge and a trailing edge, and extending longitudinally from a root to a tip, said root being integrally joined with said dovetail;
- a chordal line extending between said pressure and suction sides from said leading edge to said trailing edge; and
- two longitudinally extending flow channels including a leading edge channel having a chordally extending, imperforate septum dividing said leading edge channel into a first chamber disposed adjacent to said pressure side and second flow chamber spaced laterally from said first chamber and disposed adjacent to said suction side, said first and second chambers extending longitudinally adjacent to said leading edge; and a mid-chord channel having a chordally extending, imperforate septum dividing said mid-chord channel into a first chamber disposed adjacent to said pressure side and a second flow chamber spaced laterally from said mid-chord first chamber and disposed adjacent to said suction side, said mid-chord first and second chambers being spaced between said leading edge channel and said trailing edge; and
two supply manifolds including an inlet supply manifold disposed in said dovetail for receiving compressed air at a single pressure and disposed in flow communication with both said first and second chambers of said mid-chord channel for receiving compressed air at a single pressure, and disposed in flow communication with both said first and second chambers of said leading edge channel for channeling thereto respective portions of said compressed air; and wherein
said airfoil pressure side adjacent said mid-chord first chamber includes a plurality of longitudinally spaced apart mid-chord, pressure side film cooling holes disposed in flow communication with said mid-chord first chamber; and said airfoil pressure side adjacent said leading edge first chamber includes a plurality of longitudinally spaced apart leading edge, pressure side film cooling holes disposed in flow communication with said leading edge first chamber;

said airfoil suction side adjacent said mid-chord second chamber is imperforate for preventing flow of said compressed air second portion from being discharged from said mid-chord second chamber directly through said airfoil suction side; and said airfoil further includes leading edge, suction side film cooling holes extending through said suction side in flow communication with said leading edge second chamber.

10. A turbine blade according to claim 9 further including:

a trailing edge flow channel extending longitudinally adjacent to said trailing edge between said trailing edge and said mid-chord channel, and disposed in flow communication with a plurality of trailing edge holes;

said mid-chord channel first chamber includes an outlet disposed adjacent to said airfoil tip in flow communication with said trailing edge channel for channeling said compressed air first portion therethrough solely in an aft direction and into said trailing edge channel; and said mid-chord channel second chamber includes an outlet disposed adjacent to said airfoil tip in flow communication with said leading edge channel for channeling said compressed air second portion therefrom solely in a forward direction into said first and second chambers of said leading edge channel.

* * * * *